(12) United States Patent
Inoue

(10) Patent No.: US 9,490,485 B2
(45) Date of Patent: Nov. 8, 2016

(54) LAMINATED ELECTRICALLY CONDUCTIVE SHEET, PRODUCING METHOD THEREOF, CURRENT COLLECTOR, AND BIPOLAR BATTERY

(71) Applicant: NITTO DENKO CORPORATION, Osaka (JP)

(72) Inventor: Shinichi Inoue, Osaka (JP)

(73) Assignee: NITTO DENKO CORPORATION, Osaka (JP)

( * ) Notice: Subject to any disclaimer, the term of this patent is extended or adjusted under 35 U.S.C. 154(b) by 405 days.

(21) Appl. No.: 13/875,719

(22) Filed: May 2, 2013

(65) Prior Publication Data

US 2013/0295432 A1 Nov. 7, 2013

(30) Foreign Application Priority Data

May 7, 2012 (JP) .................. 2012-106057
Feb. 19, 2013 (JP) .................. 2013-029756

(51) Int. Cl.
*H01M 4/66* (2006.01)
*H01M 10/04* (2006.01)
*H01B 13/00* (2006.01)
*H01M 10/052* (2010.01)

(52) U.S. Cl.
CPC ......... *H01M 4/668* (2013.01); *H01B 13/0036* (2013.01); *H01M 10/044* (2013.01); *H01M 10/049* (2013.01); *H01M 10/0418* (2013.01); *H01M 10/052* (2013.01)

(58) Field of Classification Search
None
See application file for complete search history.

(56) References Cited

U.S. PATENT DOCUMENTS

| | | | |
|---|---|---|---|
| 2006/0115735 A1* | 6/2006 | Yasuda et al. | 429/233 |
| 2008/0220330 A1 | 9/2008 | Hosaka et al. | |
| 2011/0068001 A1* | 3/2011 | Affinito et al. | 204/242 |

FOREIGN PATENT DOCUMENTS

| JP | 2002-326323 A | 11/2002 |
|---|---|---|
| JP | 2006-190649 A | 7/2006 |
| JP | 2007-251049 A | 9/2007 |
| JP | 2010-277862 A | 12/2010 |

OTHER PUBLICATIONS

Tanaka JP 2010277862 A Machine translation (Dec. 2010).*
Notification of First Office Action issued by the State Intellectual Property Office (SIPO) of China on Apr. 5, 2016 in connection with Chinese Patent Application No. 201310164874.6.
Notification of Reason for Refusal issued on Aug. 30, 2016, in connection with Japanese Patent Application No. 2013-029756.

* cited by examiner

*Primary Examiner* — Carlos Barcena
*Assistant Examiner* — Wojciech Haske
(74) *Attorney, Agent, or Firm* — Jean C. Edwards, Esq.; Edwards Neils LLC

(57) ABSTRACT

A method for producing a laminated electrically conductive sheet includes the steps of preparing a support board, forming an electrically conductive layer at one side in a thickness direction of the support board, and transferring the electrically conductive layer onto at least one surface in the thickness direction of a resin-containing layer containing a resin.

9 Claims, 6 Drawing Sheets

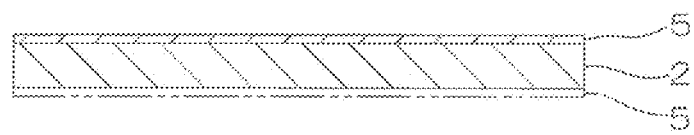
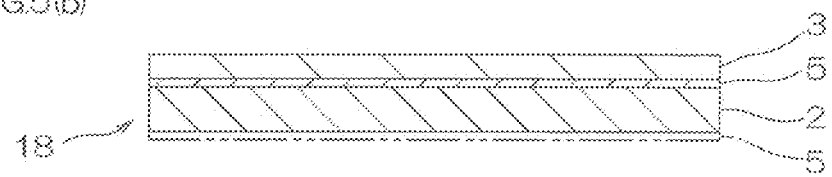
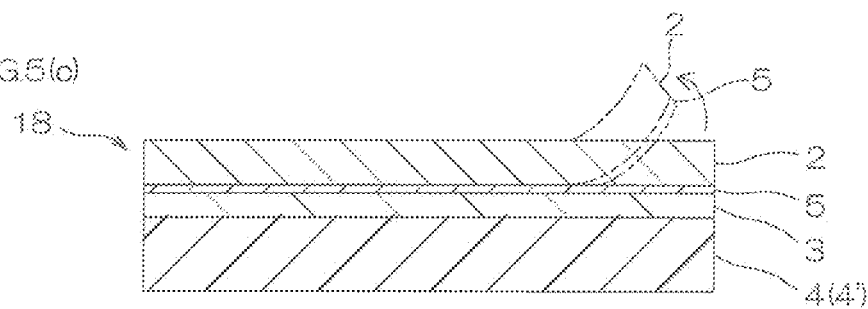
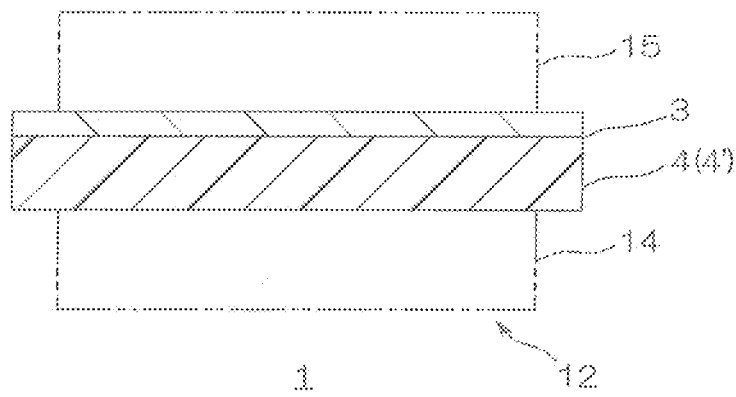

Example 3 (SEM image X2000)

Comparative Example 3 (CCD image X50)

LAMINATED ELECTRICALLY CONDUCTIVE SHEET, PRODUCING METHOD THEREOF, CURRENT COLLECTOR, AND BIPOLAR BATTERY

CROSS-REFERENCE TO RELATED APPLICATION

The present application claims priority from Japanese Patent Applications No. 2012-106057 filed on May 7, 2012 and No. 2013-029756 filed on Feb. 19, 2013, the contents of which are hereby incorporated by reference into this application.

BACKGROUND OF THE INVENTION

1. Field of the Invention

The present invention relates to a laminated electrically conductive sheet, a producing method thereof, a current collector, and a bipolar battery, to be specific, to a bipolar battery preferably used for a lithium ion secondary battery, a current collector provided therein, a laminated electrically conductive sheet, and a producing method thereof.

2. Description of Related Art

In view of requiring high energy density and high output density for an electric vehicle (EV) and a hybrid electric vehicle (HEV), a lithium ion secondary battery is mounted thereon.

In the lithium ion secondary battery, in order to achieve further higher energy density and further higher output density, a bipolar battery in which a cathode active material and an anode active material are disposed at both sides of each of a plurality of current collectors has been considered.

In recent years, in order to achieve weight reduction of the bipolar battery and to improve the output density per unit mass, for example, a bipolar battery consisting of a plurality of electrodes, each of which is provided with a current collector made of a high polymer material, a cathode electrically bonded to one surface of the current collector, and an anode electrically bonded to the other surface of the current collector, and electrolyte layers, which are disposed between a plurality of the electrodes, has been proposed (ref: for example, Japanese Unexamined Patent Publication No. 2006-190649).

In the bipolar battery proposed in Japanese Unexamined Patent Publication No. 2006-190649, however, the current collector made of a high polymer material has lower barrier properties of an electrolytic solution than that made of a metal foil, so that there is a disadvantage that lithium ions permeates the current collector in the laminating direction and liquid junction occurs between the cathode and the anode.

In order to solve such a disadvantage, a current collector for a bipolar battery including a resin layer, which has electrically conductive properties, and at least one-layered ion-blocking layer, which has electrically conductive properties and suppresses permeation of ions in a direction perpendicular to a surface, has been proposed (ref: for example, Japanese Unexamined Patent Publication No. 2010-277862).

In Japanese Unexamined Patent Publication No. 2010-277862, as a method for fabricating a current collector for a bipolar battery, a method in which a resin layer and an ion-blocking layer made of a metal foil are attached to each other by thermal compression bonding or a method in which an ion-blocking layer made of a metal is formed on a resin layer by sputtering is proposed.

SUMMARY OF THE INVENTION

In the attachment proposed in Japanese Unexamined Patent Publication No. 2010-277862, however, a metal foil is prepared with a thick thickness so as to ensure the strength required in the attachment and thereafter, the metal foil is attached to a resin layer, so that there is a disadvantage that weight reduction of the current collector for a bipolar battery cannot be sufficiently achieved.

In the sputtering proposed in Japanese Unexamined Patent Publication No. 2010-277862, the production cost is increased and a pinhole easily occurs in an ion-blocking layer formed by the sputtering, so that there is a disadvantage that ion barrier properties of the current collector for a bipolar battery are insufficient.

It is an object of the present invention to provide a method for producing a laminated electrically conductive sheet with a reduced production cost; a laminated electrically conductive sheet that is obtained by the method, has excellent ion barrier properties, and achieves weight reduction; a current collector that is made of the laminated electrically conductive sheet; and a bipolar battery that includes the current collector and is capable of achieving further higher energy density and further higher output density.

A method for producing a laminated electrically conductive sheet of the present invention includes the steps of preparing a support board, forming an electrically conductive layer at one side in a thickness direction of the support board, and transferring the electrically conductive layer onto at least one surface in the thickness direction of a resin-containing layer containing a resin.

In the method for producing a laminated electrically conductive sheet of the present invention, it is preferable that the step of transferring the electrically conductive layer onto the resin-containing layer includes the steps of preparing the resin-containing layer as a resin-containing sheet and laminating the prepared resin-containing sheet and the electrically conductive layer.

In the method for producing a laminated electrically conductive sheet of the present invention, it is preferable that the step of transferring the electrically conductive layer onto the resin-containing layer includes a step of forming the resin-containing layer by applying a varnish containing a resin to the electrically conductive layer.

In the method for producing a laminated electrically conductive sheet of the present invention, it is preferable that in the step of forming the electrically conductive layer at one side in the thickness direction of the support board, the electrically conductive layer is formed by plating.

In the method for producing a laminated electrically conductive sheet of the present invention, it is preferable that a release layer is formed on one surface in the thickness direction of the support board.

In the method for producing a laminated electrically conductive sheet of the present invention, it is preferable that the release layer is made of a metal oxide and/or a passivated metal.

In the method for producing a laminated electrically conductive sheet of the present invention, it is preferable that the support board is made of stainless steel and/or aluminum.

In the method for producing a laminated electrically conductive sheet of the present invention, it is preferable that the thickness of the electrically conductive layer is 0.1 µm or more and 5 µm or less.

In the method for producing a laminated electrically conductive sheet of the present invention, it is preferable that the resin-containing sheet has electrically conductive properties.

In the method for producing a laminated electrically conductive sheet of the present invention, it is preferable that the resin is a thermoplastic resin and/or a thermosetting resin.

In the method for producing a laminated electrically conductive sheet of the present invention, it is preferable that the resin-containing layer further contains an electrically conductive filler.

A laminated electrically conductive sheet of the present invention is produced by a method for producing a laminated electrically conductive sheet including the steps of preparing a support board, forming an electrically conductive layer at one side in a thickness direction of the support board, and transferring the electrically conductive layer onto at least one surface in the thickness direction of a resin-containing layer containing a resin.

A current collector of the present invention is made of a laminated electrically conductive sheet produced by a method for producing a laminated electrically conductive sheet including the steps of preparing a support board, forming an electrically conductive layer at one side in a thickness direction of the support board, and transferring the electrically conductive layer onto at least one surface in the thickness direction of a resin-containing layer containing a resin.

A bipolar battery of the present invention includes a plurality of electrodes disposed at spaced intervals to each other and electrolyte layers disposed between the electrodes, wherein at least one of a plurality of the electrodes includes a current collector, a cathode laminated on one surface in a thickness direction of the current collector, and an anode laminated on the other surface in the thickness direction of the current collector; and the current collector is made of a laminated electrically conductive sheet produced by a method for producing a laminated electrically conductive sheet including the steps of preparing a support board, forming an electrically conductive layer at one side in the thickness direction of the support board, and transferring the electrically conductive layer onto at least one surface in the thickness direction of a resin-containing layer containing a resin.

In the bipolar battery of the present invention, it is preferable that the bipolar battery is used as a lithium ion secondary battery.

In the bipolar battery of the present invention, it is preferable that the cathode contains a lithium compound and the electrolyte layer contains a lithium salt.

In the method for producing a laminated electrically conductive sheet of the present invention, the laminated electrically conductive sheet can be surely produced by an easy method in which the electrically conductive layer is transferred onto at least one surface in the thickness direction of the resin-containing layer.

In the method for producing a laminated electrically conductive sheet of the present invention, the support board is prepared and the electrically conductive layer is formed at one side in the thickness direction of the support board, so that in the middle of production of the laminated electrically conductive sheet, the electrically conductive layer can be supported by the support board. Therefore, the electrically conductive layer is prepared and formed with a thin thickness and the electrically conductive layer can be transferred onto the resin-containing layer, so that occurrence of a defect in the electrically conductive layer can be prevented.

In addition, the laminated electrically conductive sheet of the present invention prevents occurrence of a defect in the electrically conductive layer and therefore, has excellent ion barrier properties. The laminated electrically conductive sheet of the present invention includes the resin-containing layer containing a resin and therefore, can achieve weight reduction. Furthermore, the laminated electrically conductive sheet of the present invention has the electrically conductive layer formed with a thin thickness and therefore, can further achieve weight reduction.

Consequently, the bipolar battery provided with the current collector of the present invention can achieve further higher energy density and further higher output density, while achieving weight reduction and ensuring high reliability at low cost.

BRIEF DESCRIPTION OF THE DRAWINGS

FIG. 1(a) illustrating a step of preparing a support board,

FIG. 1(b) illustrating a step of forming an electrically conductive layer at the top side of the support board, FIG. 1(c) illustrating a step of disposing two pieces of the electrically conductive layers in opposed relation to the top side and the back side of a resin-containing sheet, FIG. 1(d) illustrating a step of laminating the two pieces of the electrically conductive layers and the resin-containing sheet, and FIG. 1(e) illustrating a step of peeling the support boards from the respective electrically conductive layers.

FIG. 5 shows process drawings for illustrating another embodiment of a method for producing a laminated electrically conductive sheet of the present invention:

FIG. 5(a) illustrating a step of preparing a support board,

FIG. 5(b) illustrating a step of forming an electrically conductive layer at the top side of the support board, FIG. 5(c) illustrating a step of laminating the electrically conductive layer and a resin-containing sheet, and FIG. 5(d) illustrating a step of peeling the support board from the electrically conductive layer.

FIG. 6 shows process drawings for illustrating a method for producing a laminated electrically conductive sheet in Comparative Example 1:

DETAILED DESCRIPTION OF THE INVENTION

Figure 1:
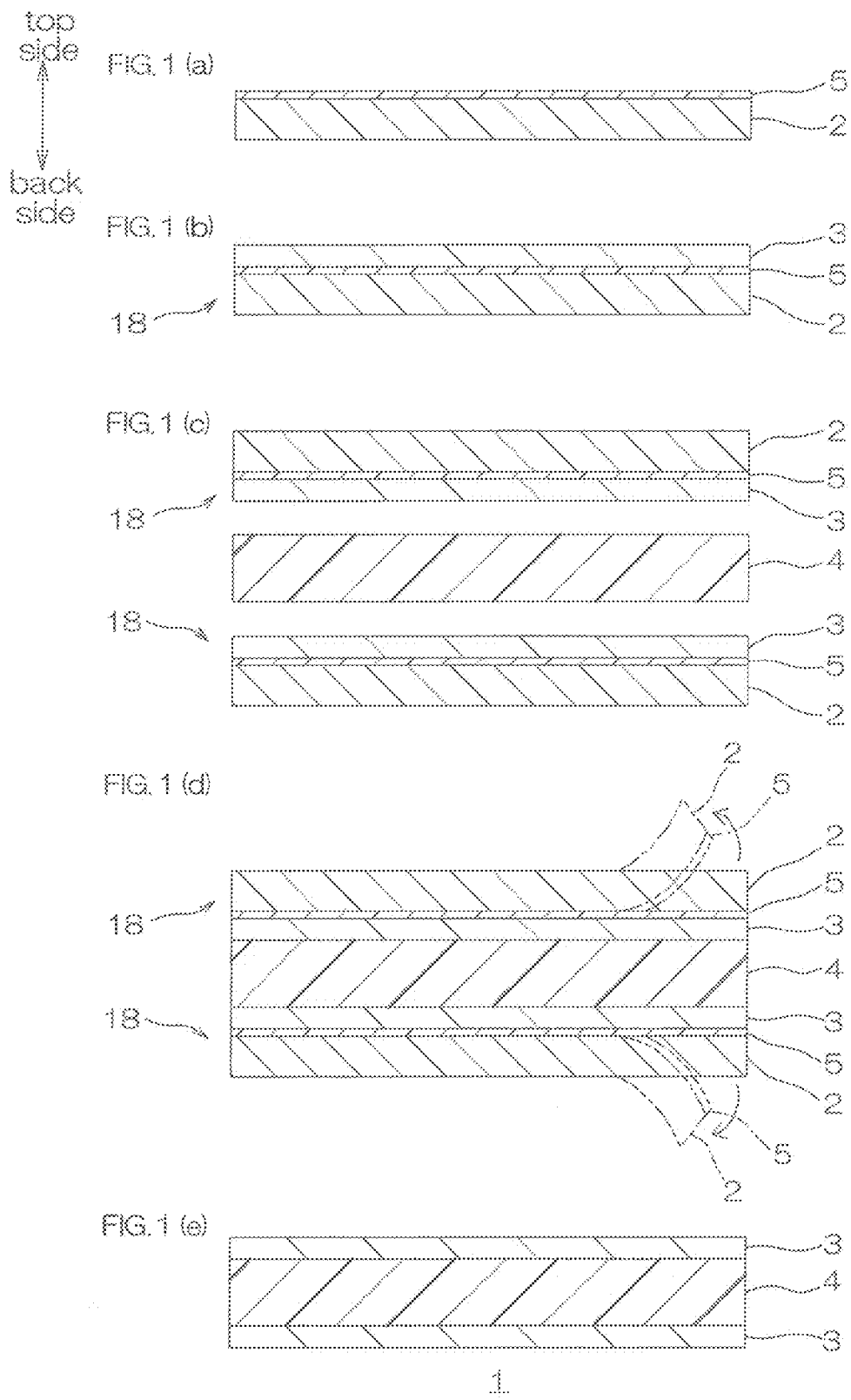
FIG. 1 shows process drawings for illustrating one embodiment of a method for producing a laminated electrically conductive sheet of the present invention.
Figure 2:
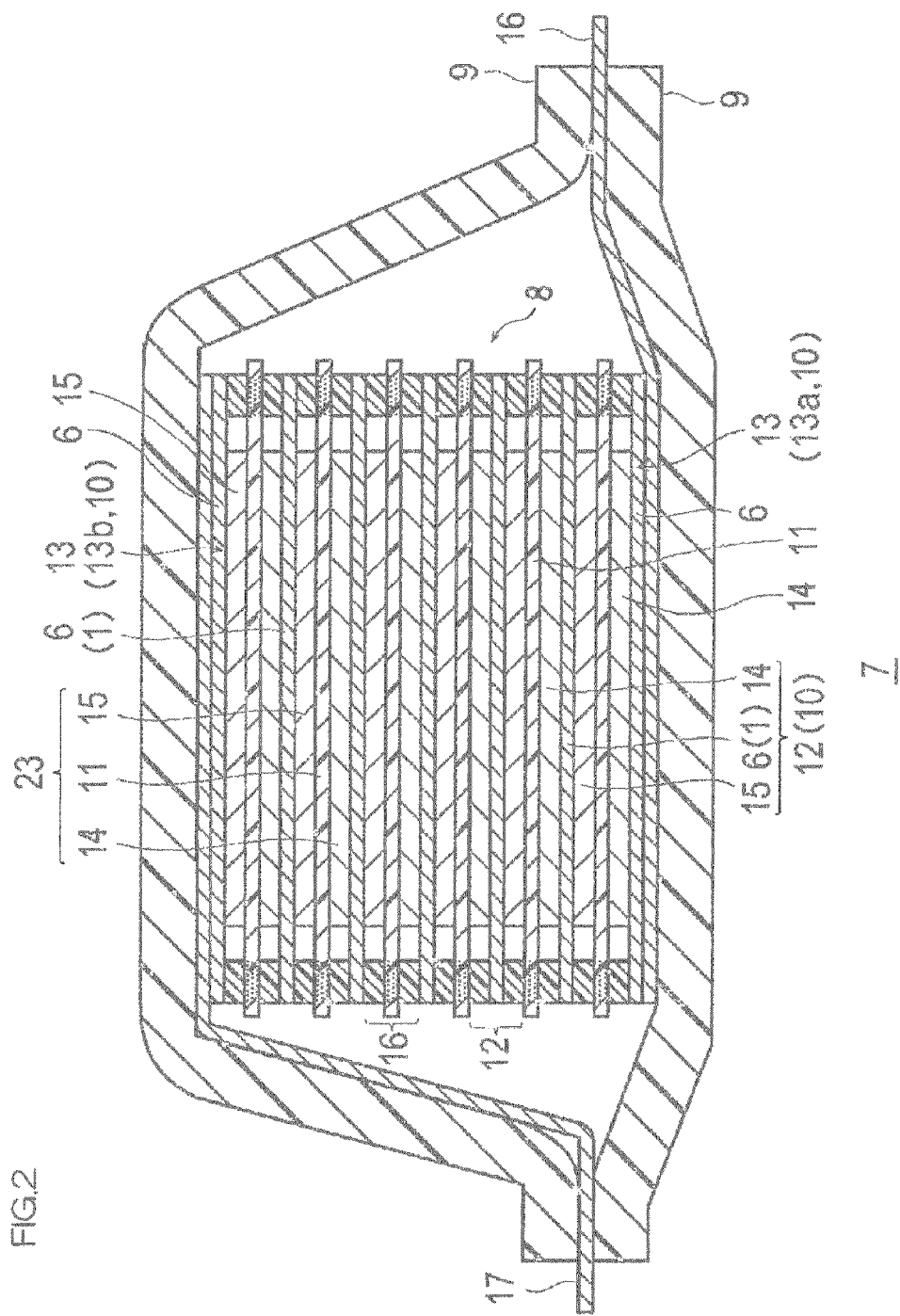
FIG. 2 shows a sectional view of one embodiment of a bipolar battery of the present invention including a plurality of electrodes each having a current collector made of the laminated electrically conductive sheet shown in FIG. 1(e).
Figure 3:
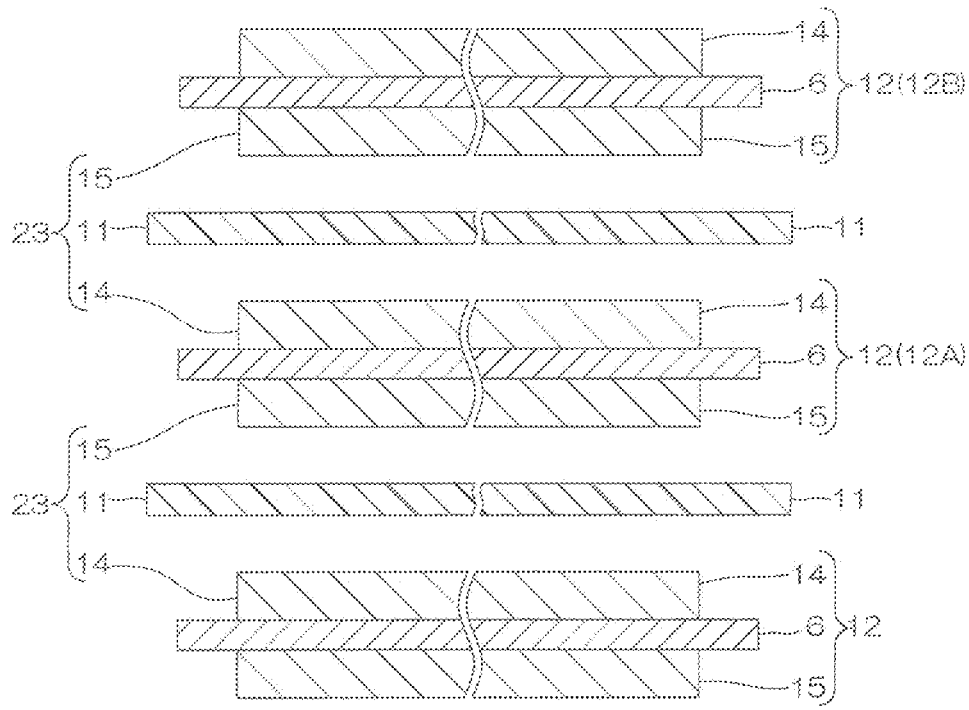
FIG. 3 shows an enlarged partial exploded view of a charge/discharge portion of the bipolar battery shown in FIG. 2.

FIG. 1 shows process drawings for illustrating one embodiment of a method for producing a laminated electrically conductive sheet of the present invention: FIG. 1(a) illustrating a step of preparing a support board, FIG. 1(b) illustrating a step of forming an electrically conductive layer at the top side of the support board, FIG. 1(c) illustrating a step of disposing two pieces of the electrically conductive layers in opposed relation to the top side and the back side of a resin-containing sheet, FIG. 1(d) illustrating a step of laminating the two pieces of the electrically conductive layers and the resin-containing sheet, and FIG. 1(e) illustrating a step of peeling the support boards from the respective electrically conductive layers. FIG. 2 shows a sectional view of one embodiment of a bipolar battery of the present invention including a plurality of electrodes each having a current collector made of the laminated electrically conductive sheet shown in FIG. 1(e). FIG. 3 shows an enlarged partial exploded view of a charge/discharge portion of the bipolar battery shown in FIG. 2.

In FIG. 2, an electrically conductive layer 3, a release layer 5, and a resin-containing sheet 4 to be described later are omitted so as to clearly show the relative arrangement of an electrode 10 and an electrolyte layer 11.

As shown in FIGS. 1(a) to 1(e), a method for producing a laminated electrically conductive sheet 1 includes the steps of preparing a support board 2 (ref: FIG. 1(a)), forming the electrically conductive layer 3 at the top side (one side in the thickness direction) of the support board 2 (ref: FIG. 1(b)), and transferring the electrically conductive layers 3 onto the top surface (one surface in the thickness direction) and the back surface (the other surface in the thickness direction) of the resin-containing sheet 4, which is one example of a resin-containing layer (ref: FIGS. 1(c) to 1(e)).

In this method, first, as shown in FIG. 1(a), the support board 2 is prepared.

The support board 2 is, for example, formed into a generally flat plate shape. Examples thereof include a metal board and a resin board. Preferably, in view of forming the electrically conductive layer 3 by electrolytic plating to be described next, a metal board is used. An example of a metal for forming the metal board includes a conductor such as aluminum, iron, copper, nickel, chromium, and an alloy containing those metals (stainless steel or the like). Preferably, aluminum and stainless steel (to be specific, the SUS304 series such as SUS304H-TA or the like) are used.

The support board 2 can be prepared alone or as a laminate of two or more.

The thickness of the support board 2 is, for example, 10 μm or more and 100 μm or less, preferably 10 μm or more and 75 μm or less, or more preferably 10 μm or more and 50 μm or less.

When the thickness of the support board 2 is outside the above-described range, workability may be reduced.

When the thickness of the support board 2 is above the above-described range, the cost may be increased. Furthermore, when the thickness of the support board 2 is above the above-described range, in a case where the electrically conductive layer 3 is formed by electrolytic plating to be described next, conduction (electric conduction) becomes poor, so that formation of the electrically conductive layer 3 may become difficult.

On the other hand, when the thickness of the support board 2 is less than the above-described range, there may be a case where the electrically conductive layer 3 to be formed next cannot be surely supported.

Preferably, the release layer 5 is formed on the top surface (one surface in the thickness direction) of the support board 2.

In the steps of transferring the electrically conductive layer 3 onto the resin-containing sheet 4 to be described next (ref: FIGS. 1(c) to 1(e)), the release layer 5 is provided as required so as to easily peel the support board 2 from the electrically conductive layer 3.

The release layer 5 is laminated on the entire top surface of the support board 2. An example of a release material for forming the release layer 5 includes, in view of forming the electrically conductive layer 3 by electrolytic plating to be described next, a conductor such as a metal oxide and a passivated metal.

An example of the metal oxide includes an oxide of a metal that forms the support board 2 described above. To be specific, examples thereof include an aluminum oxide, an iron oxide, a copper oxide, a nickel oxide, a chromium oxide, and a complex oxide.

An example of the passivated metal includes a metal that forms the support board 2 described above to be passivated. The passivated metal may include the above-described metal oxide.

These conductors can be used alone or in combination.

In order to form the release layer 5 on the top surface of the support board 2, for example, when the release layer 5 is formed of a metal oxide, sputtering or the like is used. When the release layer 5 is formed of a passivated metal, the following methods are used: (1) a method of immersing the support board 2 in a solution containing a nitric acid and another strong oxidizing agent; (2) a method of heating the support board 2 at low temperature in oxygen or clean air; and (3) a method of cathodically polarizing the support board 2 in a solution containing an oxidizing agent.

The thickness of the release layer 5 is, for example, 0.1 to 50 nm, or preferably 1 to 10 nm Next, in this method, as shown in FIG. 1(b), the electrically conductive layer 3 is formed at the top side of the support board 2.

Examples of a conductor for forming the electrically conductive layer 3 include a metal such as copper, nickel, tin, aluminum, iron, chromium, titanium, gold, silver, platinum, and niobium or an alloy containing those metals and an electrically conductive polymer such as polyaniline, polypyrrole, polythiophene, polyacetylene, polyparaphenylene, polyphenylene vinylene, polyacrylonitrile, and polyoxadiazole.

As the conductor, preferably, a metal is used, or more preferably, copper is used.

As a method for forming the electrically conductive layer 3 at the top side of the support board 2, when the electrically conductive layer 3 is formed of a metal, for example, plating, sputtering, or the like is used. On the other hand, when the electrically conductive layer 3 is formed of an electrically conductive polymer, for example, a varnish containing an electrically conductive polymer is applied and then, a coated film is dried.

As the method for forming the electrically conductive layer 3, in a case where the laminated electrically conductive sheet 1 is used as a current collector 6 of a bipolar battery 7 to be described later (ref: FIG. 2), in view of obtaining excellent ion barrier properties, preferably, plating is used, more preferably, electrolytic plating is used, or further more preferably, electrolytic copper plating is used.

In the electrolytic plating, for example, when the support board 2 is a metal board, the support board 2 is immersed in a plating solution and electricity is conducted to the support board 2. When the release layer 5 is formed, electricity is also conducted to the release layer 5.

An example of the plating solution includes an electrolytic plating solution containing an ion of the above-described metal (plating bath). Preferably, an electrolytic copper plating solution containing a copper ion (to be specific, a copper ion derived from copper sulfate) (electrolytic copper plating bath) is used.

The plating solution is prepared as an aqueous solution containing, for example, an acid, a halogen ion, and an additive along with a metal ion.

An example of the acid includes an inorganic acid such as a sulfuric acid, a hydrochloric acid, and a nitric acid. The halogen ion is produced by dissolving halogen in water. Examples of the halogen include fluorine, chlorine, bromine, and iodine. Preferably, chlorine is used. The halogen ion can also include anion derived from the above-described acid. An example of the additive includes an organic additive.

The conditions of the electrolytic plating are appropriately selected as follows: a current density of, for example, 0.1 to 5 A/dm$^2$, or preferably 0.5 to 3 A/dm$^2$ and a temperature of, for example, 10 to 30° C., or preferably normal temperature (at 25° C.).

In this way, the electrically conductive layer 3 is formed at the top side of the support board 2. To be specific, the electrically conductive layer 3 is formed at the entire top surface of the support board 2. When the release layer 5 is formed on the top surface of the support board 2, the electrically conductive layer 3 is formed on the entire top surface of the release layer 5. The electrically conductive layer 3 is supported by the support board 2 via the release layer 5, which is formed as required.

The electrically conductive layer 3 and the support board 2 are composed as a support board 18 with an electrically conductive layer.

The thickness of the electrically conductive layer 3 is, for example, 0.05 μm or more and 5 μm or less, preferably 0.1 μm or more and 5 μm or less, or more preferably 0.3 μm or more and 5 μm or less.

When the thickness of the electrically conductive layer 3 is less than the above-described range, in using the laminated electrically conductive sheet 1 as the current collector 6 of the bipolar battery 7 to be described later (ref: FIG. 2), there may be a case where excellent ion barrier properties cannot be obtained. On the other hand, when the thickness of the electrically conductive layer 3 is above the above-described range, there may be case where weight reduction and miniaturization of the bipolar battery 7 (ref: FIG. 2) cannot be achieved.

In this method, thereafter, as shown in FIGS. 1(c) to 1(e), the electrically conductive layers 3 are transferred onto the top surface and the back surface of the resin-containing sheet 4.

In order to transfer the electrically conductive layers 3 onto the top surface and the back surface of the resin-containing sheet 4, to be specific, first, as shown in FIG. 1(c), two pieces of the electrically conductive layers 3, each of which is supported by the support board 2, are prepared and the resin-containing sheet 4 is prepared.

The resin-containing sheet 4 is formed into, for example, a generally flat plate shape having the same size as that of the support board 18 with an electrically conductive layer as a sheet containing a resin as an essential component.

Examples of the resin include a thermoplastic resin and a thermosetting resin.

Examples of the thermoplastic resin include a rubber-based resin such as a polystyrene-polyisobutylene-polystyrene block copolymer rubber (SIBS) and a styrene-butadiene copolymer rubber (SBR); an olefin-based resin such as low-density polyethylene (LDPE), high-density polyethylene (HDPE), straight-chain low-density polyethylene (LLDPE), polypropylene (PP), and polybutylene; an ethylene copolymer such as an ethylene-vinyl acetate copolymer (EVA) and an ethylene-vinyl alcohol copolymer; polyester such as polyethylene terephthalate (PET) and polyethylene naphthalate (PEN); an acrylic polymer such as polymethyl acrylate (PMA) and polymethyl methacrylate (PMMA); polyether nitrile (PEN); polyimide (PI); polyamide (PA); polytetrafluoroethylene (PTFE); polyacrylonitrile (PAN); polyvinyl chloride (PVC); polyvinylidene fluoride (PVDF); and a silicone resin.

These thermoplastic resins can be used alone or in combination.

A commercially available product can be used as the thermoplastic resin. To be specific, the SIB STAR series (manufactured by Kaneka Corporation) or the like is used.

The softening temperature of the thermoplastic resin is, for example, 60 to 250° C., or preferably 80 to 200° C.

Examples of the thermosetting resin include an epoxy resin, thermosetting polyimide, a urea resin, a melamine resin, an unsaturated polyester resin, a diallyl phthalate resin, a silicone resin, a thermosetting urethane resin, and thermosetting polyamide imide (PAI).

As the thermosetting resin, preferably, an epoxy resin and thermosetting polyamide imide are used.

Examples of the epoxy resin include an aromatic epoxy resin such as a bisphenol epoxy resin (for example, a bisphenol A epoxy resin, a bisphenol F epoxy resin, a bisphenol S epoxy resin, a hydrogenated bisphenol A epoxy resin, a dimer acid-modified bisphenol epoxy resin, and the like), a novolak epoxy resin, a naphthalene epoxy resin, a fluorene epoxy resin, and a triphenylmethane epoxy resin; a nitrogen-containing-cyclic epoxy resin such as triepoxypropyl isocyanurate and a hydantoin epoxy resin; an aliphatic epoxy resin; an alicyclic epoxy resin; a glycidylether epoxy resin; and a glycidylamine epoxy resin.

Preferably, a bisphenol epoxy resin is used, or more preferably, a bisphenol F epoxy resin is used.

A commercially available product can be used as the epoxy resin. To be specific, YSLV-80XY (a bisphenol F epoxy resin, manufactured by NIPPON STEEL CHEMICAL CO., LTD.) or the like is used.

Preferably, the epoxy resin is prepared as an epoxy resin composition by using a curing agent and a curing accelerator in combination therewith.

The mixing ratio of the epoxy resin with respect to 100 parts by mass of the epoxy resin composition is, for example, 25 parts by mass or more, or preferably 50 parts by mass or more, and is, for example, less than 100 parts by mass.

Examples of the curing agent include a phenol compound (including a phenol resin), an acid anhydride compound, an amide compound, a hydrazide compound, an imidazoline compound, a urea compound, and a polysulfide compound. Preferably, a phenol compound is used.

A commercially available product can be used as the curing agent. To be specific, MEH-7851SS (a phenol compound, manufactured by MEIWA PLASTIC INDUSTRIES, LTD.) or the like is used.

The mixing ratio of the curing agent with respect to 100 parts by mass of the epoxy resin is, for example, 10 to 200 parts by mass, or preferably 50 to 150 parts by mass.

The curing accelerator contains a catalyst. Examples of the curing accelerator include an imidazole compound, a tertiary amine compound, a phosphorus compound, a quaternary ammonium salt compound, and an organic metal salt compound. Preferably, an imidazole compound is used.

An example of the imidazole compound includes a hydroxyl group-containing imidazole compound such as 2-phenyl-4,5-dihydroxymethyl imidazole and 2-phenyl-4-methyl-5-hydroxymethyl imidazole.

A commercially available product can be used as the curing accelerator. Examples thereof include 2PHZ-PW (2-phenyl-4,5-dihydroxymethyl imidazole, manufactured by SHIKOKU CHEMICALS CORPORATION) and 2P4MHZ-PW (2-phenyl-4-methyl-5-hydroxymethyl imidazole, manufactured by SHIKOKU CHEMICALS CORPORATION).

These curing accelerators can be used alone or in combination.

The mixing ratio of the curing accelerator with respect to 100 parts by mass of the curing agent is, for example, 0.01 to 15 parts by mass, or preferably 0.1 to 10 parts by mass.

The softening temperature of the thermosetting resin (in a B-stage state) is, for example, 40 to 100° C.

These resins can be used alone or in combination. Preferably, a thermoplastic resin is used alone, and a thermoplastic resin and a thermosetting resin are used in combination.

When a thermoplastic resin and a thermosetting resin are used in combination, the mixing ratio of the thermoplastic resin with respect to 100 parts by mass of the thermosetting resin is, for example, 10 to 500 parts by mass, or preferably 50 to 300 parts by mass.

Also, the resin-containing sheet 4 can further contain an electrically conductive filler.

Examples of the electrically conductive filler include a metal filler and a carbon filler.

Examples of a metal for forming the metal filler include copper, nickel, tin, aluminum, iron, chromium, titanium, gold, silver, platinum, and niobium or an alloy containing those metals. Also, examples thereof include a metal carbide, a metal nitride, and a metal oxide of the above-described metal.

Examples of carbon for forming the carbon filler include black lead (graphite) and carbon black (furnace black, acetylene black, ketjen black, and carbon nanotube).

Preferably, in view of weight reduction, a carbon filler is used.

The shape of the electrically conductive filler is not particularly limited and examples of the shape thereof include a sphere-like shape, a flake-like shape, a thin leaf-like shape, a branch-like shape, and a block-like shape (a non-fixed shape).

The average value of the maximum length (in the case of the sphere-like shape, the average particle size) of the electrically conductive filler is, for example, 0.01 μm or more and 100 μm or less, preferably 0.01 μm or more and 50 μm or less, or more preferably 0.01 μm or more and 40 μm or less.

When the average value of the maximum length of the electrically conductive filler is above the above-described range, there may be a case where the thickness of the electrically conductive layer 3 and furthermore, that of the laminated electrically conductive sheet 1 become thick to fail to achieve the miniaturization of the bipolar battery 7 (ref: FIG. 2). On the other hand, when the average value of the maximum length of the electrically conductive filler is less than the above-described range, the electrically conductive properties of the laminated electrically conductive sheet 1 may be reduced.

By containing the electrically conductive filler, the electrically conductive properties are imparted to the resin-containing sheet 4.

The mixing ratio of the electrically conductive filler with respect to the resin-containing sheet 4 is, for example, 1 to 99 mass %, or preferably 10 to 95 mass %. The mixing ratio of the electrically conductive filler with respect to 100 parts by mass of the resin is, for example, 5 to 5000 parts by mass, or preferably 10 to 2000 parts by mass.

In order to prepare the resin-containing sheet 4, the resin and the electrically conductive filler that is blended as required are dry blended to be mixed to subsequently prepare a kneaded product with a kneader or the like.

Examples of the kneader include a roll kneader, a kneading extruder, a kneading machine, a Banbury mixer, a Henschel mixer, and a planetary mixer.

In the kneading, heating is performed at, for example, a temperature that is not less than the softening temperature of the resin and when the resin contains a thermosetting resin, a temperature that is less than the temperature at which the thermosetting resin is cured (that is, the temperature at which the thermosetting resin is not cured).

To be specific, the heating temperature is, when a thermoplastic resin is contained, for example, 40 to 200° C. and on the other hand, when a thermosetting resin is (or both of the thermosetting resin and the thermoplastic resin are) contained, for example, not less than 40° C. and less than 140° C.

In the kneading of the resin, the resins may be simultaneously blended and collectively kneaded or each of the resins can be separately blended.

To be specific, when the resin contains both of the thermoplastic resin and the thermosetting resin (the epoxy resin composition) in combination, the thermoplastic resin and a part of the thermosetting resin (to be specific, the epoxy resin and the curing agent) are blended to be next heated at a temperature that is not less than the softening temperature of the thermoplastic resin and is less than the temperature at which the thermosetting resin (the epoxy resin) is not cured (to be specific, 100 to 140° C.). Thereafter, the remaining component of the thermosetting resin (to be specific, the curing accelerator) is blended thereto to be further kneaded.

The kneaded product is, when the resin contains a thermosetting resin, brought into a B-stage state.

Next, the kneaded product is processed into a sheet shape with a processor. An example of the processor includes an extruder, a roller, a calender, and a pressing machine. Preferably, a pressing machine is used. The load in pressing is, for example, $1 \times 10^3$ N to $100 \times 10^3$ N and is also 100 to 10000 kgf.

When the kneaded product is processed into a sheet shape, heating (to be specific, hot pressing) can be also performed. The temperature thereof is, for example, the same as that of the above-described kneading temperature. When the resin contains a thermosetting resin, the kneaded product retains a B-stage state without being completely cured (not being brought into a C-stage state).

In this way, the resin-containing sheet 4 is prepared.

The thickness of the resin-containing sheet 4 is, for example, 0.01 μm or more and 100 μm or less, preferably 0.01 μm or more and 50 μm or less, or more preferably 0.01 μm or more and 30 μm or less.

When the thickness of the resin-containing sheet 4 is less than the above-described range, handling of the resin-containing sheet 4 may become difficult. When the thickness of the resin-containing sheet 4 is above the above-described range, there may be a case where the thickness of the electrode 10 becomes thick at the time of disposing the laminated electrically conductive sheet 1 in the bipolar battery 7 (ref: FIG. 2), so that the miniaturization and the weight reduction of the bipolar battery 7 become difficult to be achieved.

Separately, two pieces of the electrically conductive layers 3, each of which is formed at the support board 2 via the release layer 5, are prepared.

Next, as shown in FIG. 1(c), the two pieces of the electrically conductive layers 3 (the support boards 18 with an electrically conductive layer) are disposed in opposed relation to the top side and the back side of the resin-containing sheet 4.

Next, as shown in FIG. 1(d), the two pieces of the electrically conductive layers 3 and one piece of the resin-containing sheet 4 are laminated.

To be specific, the two pieces of the electrically conductive layers 3 and the resin-containing sheet 4 are laminated by thermal compression bonding.

The heating temperature in the thermal compression bonding is a temperature that is not less than the softening temperature of the resin and when the resin contains a thermosetting resin, a temperature that is not less than the thermosetting temperature. To be specific, the heating temperature is, for example, 50 to 250° C., preferably 60 to 200° C., or more preferably 80 to 150° C. The heating duration is, for example, 0.1 to 30 minutes, or preferably 1 to 10 minutes. The pressure is, for example, 0.1 to 100 MPa, or preferably 1 to 50 MPa.

When the resin contains a thermosetting resin, the two pieces of the electrically conductive layers 3 and the resin-containing sheet 4 are completely cured by the thermal compression bonding to be brought into a C-stage state.

The thermal compression bonding can be also performed under a reduced pressure atmosphere. The degree of pressure reduction (degree of vacuum) is, for example, 1 kPa to 3 kPa.

In the thermal compression bonding, for example, a vacuum pressing machine or the like is used.

In this way, the two pieces of the electrically conductive layers 3 and the resin-containing sheet 4 are laminated.

That is, the resin-containing sheet 4 is sandwiched between the two pieces of the electrically conductive layers 3 without any space in the thickness direction. To be specific, when the resin contains a thermoplastic resin, the thermoplastic resin is softened by the above-described thermal compression bonding, so that the adhesiveness of the resin-containing sheet 4 to the electrically conductive layers 3 is improved. When the resin contains a thermosetting resin, the thermosetting resin is cured, so that the adhesiveness of the resin-containing sheet 4 to the electrically conductive layers 3 is improved.

Thereafter, as shown by arrows and phantom lines in FIG. 1(d), and in FIG. 1(e), the two pieces of the support boards 2 are peeled from the respective two pieces of the electrically conductive layers 3.

To be specific, the two pieces of the electrically conductive layers 3 and the resin-containing sheet 4 that are subjected to the thermal compression bonding are cooled to, for example, 20 to 40° C., to be specific, about room temperature and thereafter, the two pieces of the support boards 2 are peeled from the respective electrically conductive layers 3. In this way, the support boards 2 are peeled from the electrically conductive layers 3 along with the release layers 5.

In this way, as shown in FIG. 1(e), the laminated electrically conductive sheet 1 including the resin-containing sheet 4 and the two pieces of the electrically conductive layers 3 formed on both surfaces thereof is obtained.

The thickness of the laminated electrically conductive sheet 1 is, for example, 5 to 300 μm, or preferably 10 to 200 μm.

In the method for producing the laminated electrically conductive sheet 1, the laminated electrically conductive sheet 1 can be surely produced by an easy method in which the electrically conductive layers 3 are transferred onto the surfaces of the resin-containing sheet 4.

In the method for producing the laminated electrically conductive sheet 1, the support boards 2 are prepared and the electrically conductive layers 3 are formed at the top surfaces of the support boards 2, so that in the middle of production of the laminated electrically conductive sheet 1, the electrically conductive layers 3 can be supported by the support boards 2. Therefore, the electrically conductive layers 3 are prepared and formed with a thin thickness and the electrically conductive layers 3 can be transferred onto the resin-containing sheet 4, so that occurrence of a defect such as a pinhole in the electrically conductive layers 3 can be prevented.

In addition, the laminated electrically conductive sheet 1 prevents the occurrence of a defect in the electrically conductive layers 3 and therefore, has excellent ion barrier properties. The laminated electrically conductive sheet 1 of the present invention includes the resin-containing sheet 4 containing a resin and therefore, can achieve weight reduction. Furthermore, the laminated electrically conductive sheet 1 has the electrically conductive layers 3 formed with a thin thickness and therefore, can further achieve weight reduction.

In the above-described method, the step of transferring the electrically conductive layers 3 onto the resin-containing sheet 4 includes the steps of preparing the resin-containing sheet 4 and laminating the prepared resin-containing sheet 4 and the electrically conductive layers 3, so that the resin-containing sheet 4 can be easily formed.

The laminated electrically conductive sheet 1 can be used as an electrically conductive sheet of various devices. To be specific, the laminated electrically conductive sheet 1 can be, for example, used as a current collector of a bipolar battery.

Next, the bipolar battery 7 that includes the laminated electrically conductive sheet 1 shown in FIG. 1(e) as the current collector 6 is described with reference to FIGS. 2 and 3.

In FIG. 2, the bipolar battery 7 is a bipolar lithium ion secondary battery and is provided with a charge/discharge portion 8 in which a charge and discharge reaction is progressed and an exterior material 9 that houses the charge/discharge portion 8.

The charge/discharge portion 8 is formed into a generally flat plate shape and includes a plurality of the electrodes 10 that are disposed at spaced intervals to each other and the electrolyte layers 11 that are disposed between the electrodes 10.

A plurality of the electrodes 10 are laminated in the thickness direction, and include two pieces of terminal electrodes 13 that are formed at one end in the thickness direction (the topmost side) and at the other end in the thickness direction (the backmost side) and a plurality of main electrodes 12 that are disposed between the two pieces of the terminal electrodes 13.

Each of the main electrodes 12 is a bipolar electrode and to be specific, as shown in FIG. 3, includes the current collector 6, a cathode 14 that is laminated on the top surface (one surface in the thickness direction) of the current collector 6, and an anode 15 that is laminated on the back surface (the other surface in the thickness direction) of the current collector 6.

The cathode 14 is formed on the top surface of the current collector 6 in a pattern of exposing end portions (circumference end portions in the plane direction perpendicular to the thickness direction) of the current collector 6.

The cathode 14 is formed of a cathode material that contains a cathode active material as an essential component and a binder as an optional component.

The cathode active material is not particularly limited as long as it is a cathode active material used in the bipolar lithium ion secondary battery and an example thereof includes a lithium compound. Examples of the lithium compound include a lithium-transition metal complex oxide (a lithium-based complex oxide) such as $LiCoO_2$, $LiNiO_2$, and $Li(Ni—Co—Mn)O_2$; a lithium-transition metal phosphate compound; and a lithium-transition metal sulfate compound.

These cathode active materials can be used alone or in combination.

As the cathode active material, preferably, in view of volume and output properties, a lithium-transition metal complex oxide is used.

The binder is not particularly limited and examples thereof include polyethylene, polypropylene, polyethylene terephthalate (PET), polyethenitrile (PEN), polyacrylonitrile, polyimide, polyamide, cellulose, carboxymethyl cellulose (CMC), an ethylene-vinyl acetate copolymer, polyvinyl chloride, a styrene-butadiene rubber (SBR), an isoprene rubber, a butadiene rubber, an ethylene-propylene rubber, an ethylene-propylene-diene copolymer, a styrene-butadiene-styrene block copolymer and a hydrogenated polymer thereof, a styrene-isoprene-styrene block copolymer and a hydrogenated polymer thereof; polyvinylidene fluoride (PVDF), polytetrafluoroethylene (PTFE), a tetrafluoroethylene-hexafluoropropylene copolymer (FEP), a tetrafluoroethylene-perfluoroalkylvinylether copolymer (PFA), an ethylene-tetrafluoroethylene copolymer (ETFE), polychlorotrifluoroethylene (PCTFE), an ethylene-chlorotrifluoroethylene copolymer (ECTFE), polyvinyl fluoride (PVF); a vinylidene fluoride-based fluorine rubber such as a vinylidene fluoride-hexafluoropropylene-based fluorine rubber (a VDF-HFP-based fluorine rubber), a vinylidene fluoride-hexafluoropropylene-tetrafluoroethylene-based fluorine rubber (a VDF-HFP-TFE-based fluorine rubber), a vinylidene fluoride-pentafluoropropylene-based fluorine rubber (a VDF-PFP-based fluorine rubber), a vinylidene fluoride-pentafluoropropylene-tetrafluoroethylene-based fluorine rubber (a VDF-PFP-TFE-based fluorine rubber), a vinylidene fluoride-perfluoromethylvinylether-tetrafluoroethylene-based fluorine rubber (a VDF-PFMVE-TFE-based fluorine rubber), and a vinylidene fluoride-chlorotrifluoroethylene-based fluorine rubber (a VDF-CTFE-based fluorine rubber); and an epoxy resin.

These binders can be used alone or in combination.

Preferably, PVDF, polyimide, a styrene-butadiene rubber, CMC, polypropylene, PTFE, polyacrylonitrile, and polyamide are used.

The mixing ratio of the binder with respect to 100 parts by mass of the cathode material is, for example, 0.5 to 15 parts by mass, or preferably 1 to 10 parts by mass.

Also, an additive such as a conductive auxiliary agent, an electrolyte salt, and an ion-conducting polymer can be added to the cathode material at an appropriate proportion.

An example of the conductive auxiliary agent includes the above-described carbon filler.

An example of the electrolyte salt includes a lithium salt such as $Li(C_2F_5SO_2)_2N$, $LiPF_6$, $LiBF_4$, $LiClO_4$, $LiAsF_6$, and $LiCF_3SO_3$.

An example of the ion-conducting polymer includes polyalkylene oxide such as a polyethylene oxide (PEO)-based polymer and a polypropylene oxide (PPO)-based polymer.

In order to laminate the cathode 14 on the top surface of the current collector 6, for example, the above-described cathode material is blended in a solvent such as N-methyl-pyrrolidone (NMP), dimethyl carbonate (DMC), and acetonitrile at an appropriate proportion to prepare a slurry. Next, the slurry is applied to the top surface of the current collector 6 and then, the coated film is dried by heating.

In this way, the cathode 14 is formed on the top surface of the current collector 6 in the above-described pattern.

The anode 15 is formed on the back surface of the current collector 6 so as to expose the end portions (the circumference end portions in the plane direction) of the current collector 6. To be specific, the anode 15 is formed so as to be in the same pattern as that of the cathode 14 when projected in the thickness direction.

The anode 15 is formed of an anode material that contains an anode active material as an essential component and a binder as an optional component.

The anode active material is not particularly limited as long as it is an anode active material used in the bipolar lithium ion secondary battery and examples thereof include a carbon active material such as graphite, soft carbon, and hard carbon; a lithium-transition metal complex oxide (for example, $Li_4Ti_5O_{12}$); a metal active material; and a lithium alloy-based anode active material.

These anode active materials can be used alone or in combination.

As the anode active material, preferably, in view of volume and output properties, a carbon active material and a lithium-transition metal complex oxide are used.

An example of the binder includes a binder illustrated in the cathode material. The mixing proportion of the binder is the same as the description above.

Also, an additive illustrated in the cathode material can be, for example, added to the anode material at an appropriate proportion.

In order to laminate the anode 15 on the back surface of the current collector 6, for example, the above-described anode material is blended in the above-described solvent at an appropriate proportion to prepare a slurry. Next, the slurry is applied to the back surface of the current collector 6 and then, the coated film is dried by heating.

In this way, the anode 15 is formed on the back surface of the current collector 6 in the above-described pattern.

A plurality of the main electrodes 12 are laminated in the thickness direction via a plurality of the electrolyte layers 11. That is, the electrolyte layers 11 are interposed between a plurality of the main electrodes 12 that are adjacent to each other in the thickness direction. To be more specific, the main electrodes 12 and the electrolyte layers 11 are alternately laminated in the thickness direction in a sequential order.

The cathode 14 in one main electrode 12A and the anode 15 in another main electrode 12B that is adjacent to the one main electrode 12A are disposed in opposed relation to each other in the thickness direction and the electrolyte layer 11 is interposed therebetween. Each of the main electrodes 12 and each of the electrolyte layers 11 are alternately laminated so as to be sandwiched therebetween.

The electrolyte layer 11 is formed into a generally flat plate shape and is composed so as to be capable of retaining an electrolyte between the main electrodes 12 that are adjacent to each other.

Examples of the electrolyte include a liquid electrolyte and a solid electrolyte.

The liquid electrolyte has a structure in which a supporting electrolyte is dissolved in an organic solvent. Examples of the organic solvent include carbonates such as ethylene carbonate (EC) and propylene carbonate (PC). An example of the supporting electrolyte includes a lithium salt.

On the other hand, examples of the solid electrolyte include a gel electrolyte that contains an electrolytic solution and a true solid electrolyte that does not contain an electrolytic solution.

The gel electrolyte is formed by dispersing the above-described liquid electrolyte into a matrix polymer made of the above-described ion-conducting polymer.

When the electrolyte layer 11 is formed of a liquid electrolyte and a gel electrolyte, a separator can be provided in the electrolyte layer 11. An example of the separator includes a microporous film made of polyolefin such as polyethylene and polypropylene.

The true solid electrolyte is prepared by dissolving the supporting electrolyte into the above-described matrix polymer and does not contain an organic solvent (a plasticizer or the like).

The cathode 14 (to be specific, the cathode 14 in one main electrode 12A), the electrolyte layer 11, and the anode 15 (the anode 15 that sandwiches the electrolyte layer 11 with the cathode 14, to be specific, the anode 15 in another main electrode 12B) constitute one single cell layer 23.

In this way, the bipolar battery 7 is formed by laminating a plurality of the single cell layers 23. The current collector 6 is interposed between the single cell layers 23 that are adjacent to each other.

As shown in FIG. 2, each of the two pieces of the terminal electrodes 13 is provided with the current collector 6 and either the cathode 4 or the anode 15, which is formed on the top surface or the back surface of the current collector 6.

To be specific, a terminal electrode 13a at the side of the cathode (the backmost side) is not provided with the anode 15, while provided with the current collector 6 and the cathode 14 that is laminated on the top surface thereof.

A cathode current collector plate 16 is provided on the back surface of the terminal electrode 13a at the side of the cathode.

The cathode current collector plate 16 integrally includes a cover portion that covers the back surface of the terminal electrode 13a at the side of the cathode and an extending portion that extends from the cover portion in one direction in the plane direction (in the right direction in FIG. 2).

A terminal electrode 13b at the side of the anode (the topmost side) is not provided with the cathode 14, while provided with the current collector 6 and the anode 15 that is laminated on the back surface thereof.

An anode current collector plate 17 is provided on the top surface of the terminal electrode 13b at the side of the anode.

The anode current collector plate 17 integrally includes a cover portion that covers the top surface of the terminal electrode 13b at the side of the anode and an extending portion that extends from the cover portion in the other direction in the plane direction (in the left direction in FIG. 2).

Examples of the exterior material 9 include a metal case or a bag-shaped laminated film. Preferably, in view of having excellent high output properties and cooling properties and allowing the bipolar battery 7 to be mounted on EV and/or HEV, a laminated film is used. An example of the laminated film includes a laminated film having a three layer structure in which PP, aluminum, and nylon (polyamide) are sequentially laminated in this order.

The exterior material 9 seals the charge/discharge portion 8. On the other hand, the exterior material 9 exposes free end portions of the extending portions in the cathode current collector plate 16 and the anode current collector plate 17.

While at the time of discharging electricity (generating electricity) of the bipolar battery 7, the electricity based on a discharge reaction in the charge/discharge portion 8 is taken out via the free end portions exposed from the exterior material 9 in the cathode current collector plate 16 and the anode current collector plate 17, at the time of charging electricity (storing electricity) of the bipolar battery 7, the electricity is supplied from the free end portions to the charge/discharge portion 8.

The bipolar battery 7 provided with the above-described current collector 6 can achieve further higher energy density and further higher output density, while achieving weight reduction and ensuring high reliability at low cost.

The bipolar battery 7 is mounted on a vehicle such as EV and HEV to be used as a driving power source. Alternatively, for example, the bipolar battery 7 can be also used as a disposed power source such as an uninterruptible power supply.

In the embodiment in FIG. 1, the release layer 5 is formed on the top surface of the support board 2. Alternatively, for example, though not shown, the electrically conductive layer 3 can be formed so as to be in direct contact with the top surface of the support board 2 without forming the release layer 5 on the top surface of the support board 2.

Preferably, as in the embodiment in FIG. 1, the release layer 5 is formed on the top surface of the support board 2.

In this way, as shown by the phantom lines in FIG. 1(d), and in FIG. 1(e), the support boards 2 can be easily and surely peeled from the electrically conductive layers 3.

Figure 4:
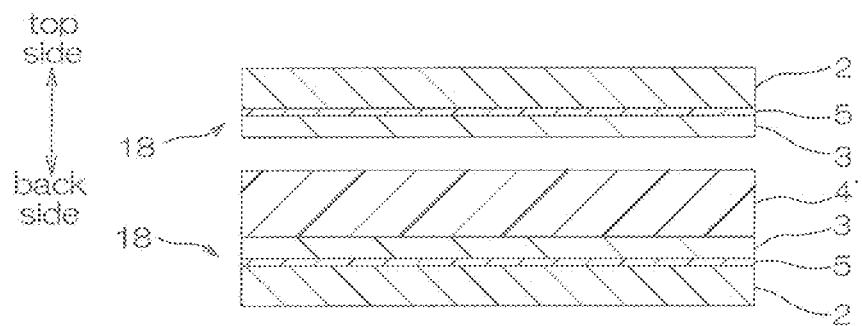
FIG. 4 shows a partial process drawing for illustrating another embodiment of a method for producing a laminated electrically conductive sheet of the present invention, showing a step of forming a resin-containing layer by applying a varnish to an electrically conductive layer.

FIG. 4 shows a partial process drawing for illustrating another embodiment of a method for producing a laminated electrically conductive sheet of the present invention, showing a step of forming a resin-containing layer by applying a varnish to an electrically conductive layer. FIG. 5 shows process drawings for illustrating another embodiment of a method for producing a laminated electrically conductive sheet of the present invention: FIG. 5(a) illustrating a step of preparing a support board, FIG. 5(b) illustrating a step of forming an electrically conductive layer at the top side of the support board, FIG. 5(c) illustrating a step of laminating the electrically conductive layer and a resin-containing sheet, and FIG. 5(d) illustrating a step of peeling the support board from the electrically conductive layer.

In each figure to be described below, the same reference numerals are provided for members corresponding to each of those described above, and their detailed description is omitted.

In the embodiment in FIG. 1, in the steps of transferring the electrically conductive layers 3 onto the surfaces of the resin-containing sheet 4 (FIG. 1(c) to FIG. 1(e)), as shown in FIG. 1 (c), the resin-containing sheet 4 is formed to be prepared from a sheet containing a resin and, if necessary, an electrically conductive filler and next, as shown in FIG. 1(d), the electrically conductive layers 3 are laminated on the prepared resin-containing sheet 4. Alternatively, as referred in FIG. 4, for example, a varnish containing a resin and, if necessary, an electrically conductive filler is prepared and next, as shown in the lower-side view in FIG. 4, the prepared varnish is applied to the top surface of the electrically conductive layer 3 to form a coated film. Thereafter, the coated film is heated as required, so that a resin-containing layer 4' and the electrically conductive layer 3 can be also laminated.

For example, a solvent and a dispersant can be also blended in the varnish as required.

Examples of the solvent include ethyl acetate, methyl ethyl ketone, and N-methylpyrrolidone. The mixing ratio thereof with respect to 100 parts by mass of the resin is, for example, 30 to 2700 parts by mass, or preferably 90 to 1200 parts by mass.

The dispersant is not particularly limited and examples thereof include a surfactant and a polymer dispersant. The mixing ratio thereof is appropriately set.

The heating conditions of the coated film is as follows: a temperature of, for example, 30 to 450° C., or preferably 50 to 350° C. and a duration of, for example, 0.1 to 200 minutes, or preferably 1 to 100 minutes. The heating may be performed at different temperatures. For example, a first-step heating (to be specific, drying) and a second-step heating (to be specific, curing, that is, cure) in which the heating temperature and the heating duration exceed those in the first-step heating can be sequentially performed. In the first-step heating, the temperature is, for example, 50 to 200° C., or preferably 70 to 150° C. and the duration is, for example, 1 to 30 minutes, or preferably 5 to 20 minutes. In the second-step heating, the temperature is, for example, 150 to 420° C., or preferably 250 to 370° C. and the duration is, for example, 10 to 200 minutes, or preferably 20 to 150 minutes.

Thereafter, as shown in FIGS. 4 and 1(d), another electrically conductive layer 3 can be laminated on the back surface of the resin-containing layer 4' in which the electrically conductive layer 3 is laminated on the top surface thereof.

Alternatively, though not shown, two pieces of the resin-containing layers 4' on which the electrically conductive layers 3 are laminated are prepared and the two pieces of the resin-containing layers 4' can be laminated so as to be in contact with each other.

According to this method, the resin-containing sheet 4 is not required to be prepared in advance and the resin-containing layer 4' can be laminated on the electrically conductive layer 3, so that the production method becomes easy.

In the embodiment in FIG. 1, the two pieces of the electrically conductive layers 3 are transferred onto the top surface and the back surface of the resin-containing sheet 4, respectively. Alternatively, for example, as shown in FIG. 5, one piece of the electrically conductive layer 3 can be also transferred onto the top surface (one surface in the thickness direction) only of the resin-containing sheet 4.

In the embodiment in FIG. 5, first, as shown in FIG. 5(a), the support board 2 is prepared and next, as shown in FIG. 5(b), the electrically conductive layer 3 is laminated at the top side of the support board 2. Thereafter, as shown in FIGS. 5(c) and 5(d), one piece of the electrically conductive layer 3 is transferred onto the top surface of the resin-containing sheet 4.

To be specific, in order to transfer the electrically conductive layer 3 onto the top surface of the resin-containing sheet 4, as shown in FIG. 5(c), one piece of the electrically conductive layer 3 and one piece of the resin-containing sheet 4 are laminated and next, as shown by the phantom lines in FIG. 5(c), the support board 2 is peeled from the electrically conductive layer 3.

In this way, as shown in FIG. 5(d), the laminated electrically conductive sheet 1 including the resin-containing sheet 4 and the electrically conductive layer 3 formed on the top surface (one surface) thereof is obtained.

In order to use the laminated electrically conductive sheet 1 as the current collector 6 (ref. FIG. 2) of the main electrode 12 in the bipolar battery 7, as shown by the phantom lines in FIG. 5, the cathode 14 is provided on the back surface of the laminated electrically conductive sheet 1 and the anode 15 is provided on the top surface of the laminated electrically conductive sheet 1, so that the main electrode 12 provided with the cathode 14 and the anode 15 is fabricated.

Then, as referred in FIG. 2, the bipolar battery 7 provided with the main electrode 12 is obtained.

According to the embodiment in FIG. 5, the same function and effect as those of the embodiments in FIGS. 1 to 3 can be achieved.

In the embodiment in FIG. 5, as shown in FIGS. 5(c) and 5(d), one piece of the electrically conductive layer 3 is transferred onto the top surface of the resin-containing sheet 4. Alternatively, for example, though not shown, first, a varnish containing the above-described resin and, if necessary, an electrically conductive filler is prepared and next, the prepared varnish is applied to the top surface of the electrically conductive layer 3 to form a coated film. Thereafter, the coated film is dried by heating as required, so that the resin-containing layer 4' and the electrically conductive layer 3 can be also laminated.

As shown by the phantom lines in FIGS. 5(a) and 5(b), the release layers 5 can be also provided on both surfaces of the support board 2.

In the embodiments in FIGS. 2 and 3, the bipolar battery of the present invention is described as a lithium ion secondary battery. However, the bipolar battery of the present invention is not limited to this and can be also used as, for example, a sodium ion secondary battery, a potassium ion secondary battery, a nickel-metal hydride secondary battery, a nickel-cadmium secondary battery, or a nickel-metal hydride battery.

EXAMPLES

While the present invention will be described hereinafter in further detail with reference to Production Examples, Examples, and Comparative Examples, the present invention is not limited to these Production Examples, Examples, and Comparative Examples.

Production Example A

Resin-Containing Sheet Containing Thermoplastic Resin 16 parts by mass of carbon black (EC300J, an average particle size of 39.5 nm, manufactured by Lion Corporation) and 84 parts by mass of SIBS (SIBSTAR 072T, manufactured by Kaneka Corporation) were dry blended to be kneaded at 170° C. and 30 rpm for 30 minutes with a laboblast mill, so that a kneaded product was obtained.

Thereafter, the obtained kneaded product was processed into a piece having a 20 mm square size and then, the processed piece was processed into a sheet shape by being pressed at 140° C. and a load of 3000 kgf for 5 minutes with a pressing machine, so that a resin-containing sheet having a thickness of 100 μm was obtained.

Production Example B

Resin-Containing Sheet Containing Thermoplastic Resin and Thermosetting Resin

After 16 parts by mass of carbon black (EC300J, an average particle size of 39.5 nm, manufactured by Lion Corporation), 26 parts by mass of an epoxy resin (YSLV-80XY, a bisphenol F epoxy resin, manufactured by NIPPON STEEL CHEMICAL CO., LTD.), 25 parts by mass of a phenol resin (MEH-7851SS, manufactured by MEIWA PLASTIC INDUSTRIES, LTD.), and 33 parts by mass of SIBS (SIBSTAR 072T, manufactured by Kaneka Corporation) were dry blended to be kneaded at 170° C. and 30 rpm for 30 minutes with a laboblast mill, the resin temperature was confirmed to be 120° C. Thereafter, 0.5 parts by mass of 2-phenyl-4,5-dihydroxymethyl imidazole (2PHZ-PW, a catalyst (a curing accelerator), manufactured by SHIKOKU CHEMICALS CORPORATION) was added to the obtained mixture to be kneaded at 120° C. and 30 rpm for 10 minutes with a laboblast mill, so that a kneaded product was obtained.

Thereafter, the obtained kneaded product was processed into a piece having a 20 mm square size and then, the processed piece was processed into a sheet shape by being pressed at 120° C. and a load of 3000 kgf for 5 minutes with a pressing machine, so that a resin-containing sheet (in a B-stage state) having a thickness of 100 μm was obtained.

Production Example C

Resin-Containing Sheet Containing Thermoplastic Resin and Thermosetting Resin

After 18 parts by mass of carbon black (EC300J, an average particle size of 39.5 nm, manufactured by Lion Corporation), 42 parts by mass of graphite (JB-5, a flake-like shape, an average value of the maximum length of 50 μm, manufactured by Nippon Graphite Industries, ltd.), 13 parts by mass of an epoxy resin (YSLV-80XY, a bisphenol F epoxy resin, manufactured by NIPPON STEEL CHEMICAL CO., LTD.), 14 parts by mass of a phenol resin (MEH-7851SS, manufactured by MEIWA PLASTIC INDUSTRIES, LTD.), and 13 parts by mass of SIBS (SIBSTAR 072T, manufactured by Kaneka Corporation) were dry blended to be kneaded at 170° C. and 30 rpm for 30 minutes with a laboblast mill, the resin temperature was confirmed to be 120° C. Thereafter, 0.5 parts by mass of a catalyst (2PHZ-PW, manufactured by SHIKOKU CHEMICALS CORPORATION) was added to the obtained mixture to be kneaded at 120° C. and 30 rpm for 10 minutes with a laboblast mill, so that a kneaded product in a B-stage state was obtained.

Thereafter, the obtained kneaded product was processed into a piece having a 20 mm square size and then, the processed piece was processed into a sheet shape by being pressed at 120° C. and a load of 3000 kgf for 5 minutes with a pressing machine to be cured. In this way, a resin-containing sheet having a thickness of 100 μm was obtained.

Production Example D

Resin-Containing Sheet Containing Thermoplastic Resin and Thermosetting Resin

After 93 parts by mass of copper powder (HWQ-20, a sphere-like shape, an average particle size of 20 μm, manufactured by FUKUDA METAL FOIL & POWDER Co., LTD.), 2 parts by mass of an epoxy resin (YSLV-80XY, a bisphenol F epoxy resin, manufactured by NIPPON STEEL CHEMICAL CO., LTD.), 2 parts by mass of a phenol resin (MEH-7851SS, manufactured by MEIWA PLASTIC INDUSTRIES, LTD.), and 3 parts by mass of SIBS (SIBSTAR 072T, manufactured by Kaneka Corporation) were dry blended to be kneaded at 170° C. and 30 rpm for 30 minutes with a laboblast mill, the resin temperature was confirmed to be 120° C. Thereafter, 0.5 parts by mass of 2-phenyl-4,5-dihydroxymethyl imidazole (2PHZ-PW, a catalyst (a curing accelerator), manufactured by SHIKOKU CHEMICALS CORPORATION) was added to the obtained mixture to be kneaded at 120° C. and 30 rpm for 10 minutes with a laboblast mill, so that a kneaded product in a B-stage state was obtained.

Thereafter, the obtained kneaded product was processed into a piece having a 20 mm square size and then, the processed piece was processed into a sheet shape by being pressed at 120° C. and a load of 3000 kgf for 5 minutes with a pressing machine to be cured. In this way, a resin-containing sheet in a C-stage state having a thickness of 100 μm was obtained.

The formulation of the resin-containing sheet is shown in Table 1.

TABLE 1

| | | | | Production Ex. A to D | | | |
|---|---|---|---|---|---|---|---|
| | | | | Production Ex. A | Production Ex. B | Production Ex. C | Production Ex. D |
| Formulation of Resin-Containing Sheet (parts by mass) | Thermoplastic Resin | SIBS | SIBSTAR 072T | 84 | 33 | 13 | 3 |
| | Thermosetting Resin | Epoxy Resin | YSLV-80XY | — | 26 | 13 | 2 |
| | | Phenol Resin | MEH-7851SS | — | 25 | 14 | 2 |
| | | Curing Accelerator | 2PHZ-PW | — | 0.5 | 0.5 | 0.5 |
| | Electrically Conductive Filler | Carbon Black | Ketjen Black EC300J | 16 | 16 | 18 | — |
| | | Graphite | JB-5 | — | — | 42 | — |
| | | Copper Powder | HWQ-20 | — | — | — | 93 |

Production Example 1

Support Board: Stainless Steel/Electrically Conductive Layer: Copper

SUS304H-TA (a stainless steel foil, a thickness of 50 μm, manufactured by Nippon Steel Materials Co., Ltd.) was prepared as a support board. On the top surface and the back surface of the support board, release layers, each of which was made of a passivated metal and had a thickness of 5 nm, were formed.

Subsequently, copper sulfate (manufactured by JX Nippon Mining & Metals Corporation), a sulfuric acid (manufactured by Wako Pure Chemical Industries), a hydrochloric acid (manufactured by Wako Pure Chemical Industries), and an organic additive (manufactured by Electroplating Engineers of Japan Ltd., CC-1220) were blended into water so as to have the following concentration, so that an electrolytic copper plating solution was prepared.

Copper sulfate (manufactured by JX Nippon Mining & Metals Corporation) 70 g/L

Sulfuric acid (manufactured by Wako Pure Chemical Industries) 180 g/L

Hydrochloric acid (manufactured by Wako Pure Chemical Industries) 40 mg/L (containing chlorine ion)

Organic additive 3 mL/L (manufactured by Electroplating Engineers of Japan Ltd., CC-1220)

Next, a support board as the anode and a copper plate as the cathode were immersed in the electrolytic copper plating solution and under the conditions of the temperature of electrolytic solution of 25° C. and the current density of 1.3 A/dm$^2$, electrolytic copper plating was performed, while the electrolytic copper plating solution was subjected to bubbling. In this way, an electrically conductive layer having a thickness described in Table 2 was formed at the top side (and the back side) of the support board (ref: FIG. 5(a)). To be specific, the electrically conductive layers were formed on the top surface of the release layer at the top side of the support board and on the back surface of the release layer at the back side of the support board.

That is, a support board with an electrically conductive layer was fabricated.

Production Example 2

Support Board: Aluminum/Electrically Conductive Layer: Copper

An electrically conductive layer having a thickness described in Table 2 was formed at the top side (and the back side) of the support board in the same manner as in Production Example 1, except that an aluminum foil (manufactured by Takeuchi Metal Foil and Powder Co., Ltd.) was prepared as a support board instead of SUS304H-TA (a stainless steel foil).

Examples 1 to 7

Transferring of Electrically Conductive Layer

Each of the resin-containing sheets (Production Examples A to D) and each of the support boards with an electrically conductive layer (Production Examples 1 and 2) were prepared (ref: FIG. 5(b)). To be specific, the electrically conductive layer was disposed in opposed relation to the top side of the resin-containing sheet.

Next, the electrically conductive layer was transferred onto the resin-containing sheet (ref: FIGS. 5(c) and 5(d)).

To be specific, first, the support board with an electrically conductive layer and the resin-containing sheet were laminated by thermal compression bonding. To be more specific, the support board with an electrically conductive layer and the resin-containing sheet were overlapped in such a way that the electrically conductive layer was adjacent to the resin-containing sheet to be subjected to thermal compression bonding at 140° C. and 10 MPa for 2 minutes using a vacuum pressing machine (degree of vacuum of 1.3 kPa) (ref: FIG. 5(c)).

The resin-containing sheets in Examples 2 to 7 using Production Examples B to D, each of which contained a thermosetting resin, were completely cured (brought into a C-stage state).

After the thermal compression bonding, the resulting product was cooled to room temperature and thereafter, the support board was peeled from the electrically conductive layer (ref: the phantom lines in FIG. 5(c)).

In this way, the electrically conductive layer was transferred onto the resin-containing sheet.

In this way, a laminated electrically conductive sheet was fabricated (ref: FIG. 5(e)).

Example 7

A varnish containing 100 parts by mass of polyamide imide, 20 parts by mass of carbon black, and 700 parts by mass of N-methylpyrrolidone was prepared. Subsequently, the varnish was applied to the top surface of the support board with an electrically conductive layer (Production Example 1) to form a coated film. Thereafter, the coated film was heated at 100° C. for 10 minutes to be dried and subsequently, was heated at 250° C. for 30 minutes to be cured. In this way, the resin-containing layer and the electrically conductive layer were laminated (ref: FIG. 4).

Thereafter, the support board was peeled from the electrically conductive layer (ref: the phantom lines in FIG. 1(d)).

In this way, the electrically conductive layer was transferred onto the resin-containing sheet.

In this way, a laminated electrically conductive sheet was fabricated (ref: FIG. 1(e)).

Example 8

A laminated electrically conductive sheet was fabricated in the same manner as in Example 7, except that 100 parts by mass of polyimide was used instead of 100 parts by mass of polyamide imide; the heating (curing) temperature of the coated film was changed from 250° C. to 350° C.; and the heating (curing) duration was changed from 30 minutes to 60 minutes.

Comparative Examples 1 to 3

Direct Formation of Electrically Conductive Layer

Copper sulfate (manufactured by JX Nippon Mining & Metals Corporation), a sulfuric acid (manufactured by Wako Pure Chemical Industries), a hydrochloric acid (manufactured by Wako Pure Chemical Industries), and an organic additive (manufactured by Electroplating Engineers of Japan Ltd., CC-1220) were blended into water so as to have the following concentration, so that an electrolytic copper plating solution was prepared.

Copper sulfate (manufactured by JX Nippon Mining & Metals Corporation) 70 g/L

Sulfuric acid (manufactured by Wako Pure Chemical Industries) 180 g/L

Hydrochloric acid (manufactured by Wako Pure Chemical Industries) 40 mg/L (containing chlorine ion)

Organic additive 3 mL/L (manufactured by Electroplating Engineers of Japan Ltd., CC-1120)

Figure 6A:
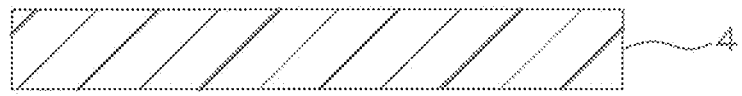
FIG. 6(a) illustrating a step of preparing a resin-containing sheet.
Figure 6B:
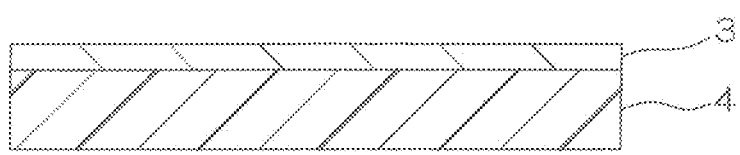
FIG. 6(b) illustrating a step of forming an electrically conductive layer on the top surface of the resin-containing sheet.

Next, the resin-containing sheet fabricated in Production Example C (ref: FIG. 6(a)) as the anode and a copper plate as the cathode were immersed in the electrolytic copper plating solution and under the conditions of the temperature of electrolytic solution of 25° C. and the current density of 1.3 A/dm$^2$, electrolytic copper plating was performed, while the electrolytic copper plating solution was subjected to bubbling. In this way, an electrically conductive layer having a thickness described in Table 2 was formed on the top surface of the resin-containing sheet (ref: FIG. 6(b)).

That is, the electrically conductive layer was fabricated directly on the resin-containing sheet.

In this way, a laminated electrically conductive sheet was fabricated.

(Evaluation)

(Evaluation of Appearance)

The appearance of the laminated electrically conductive sheets was observed visually and was evaluated based on the following criteria. The results are shown in Table 2.

Good: Unevenness or break was not observed.

Bad: Unevenness was observed.

(Pinhole)

Figure 8:
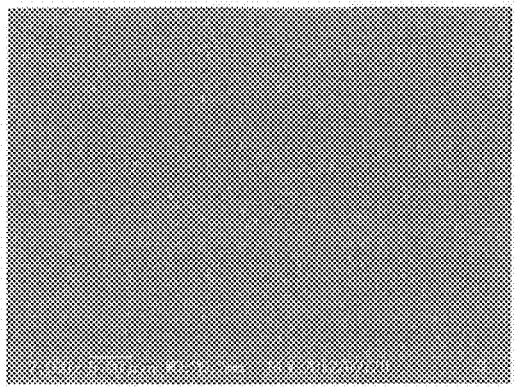
FIG. 8 shows a processed SEM image of an electrically conductive layer in Example 3.
Figure 9:
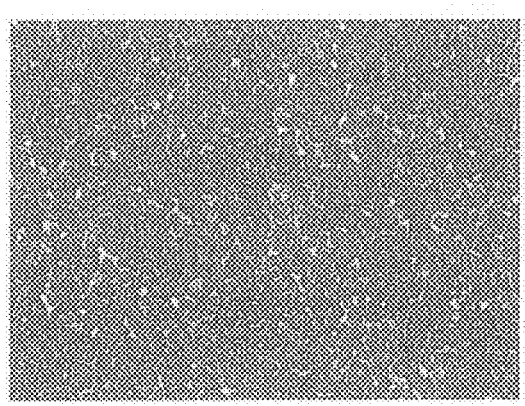
FIG. 9 shows a processed CCD image of an electrically conductive layer in Comparative Example 3.

The surface of each of the electrically conductive layers was observed with an optical microscope and an SEM. The results are shown in Table 2. The SEM photograph of Example 3 and the CCD photograph with the optical microscope of Comparative Example 3 are shown in FIGS. 8 and 9, respectively.

Good: No pinhole was observed.

Poor: Pinhole having an inner diameter of 500 nm or more was not observed.

Bad: Pinhole having an inner diameter of 500 nm or more was observed.

(Mass Change/Evaluation of Ion Barrier Properties)

First, the laminated electrically conductive sheet was cut into a piece having a size of 3×3 cm.

Figure 7:
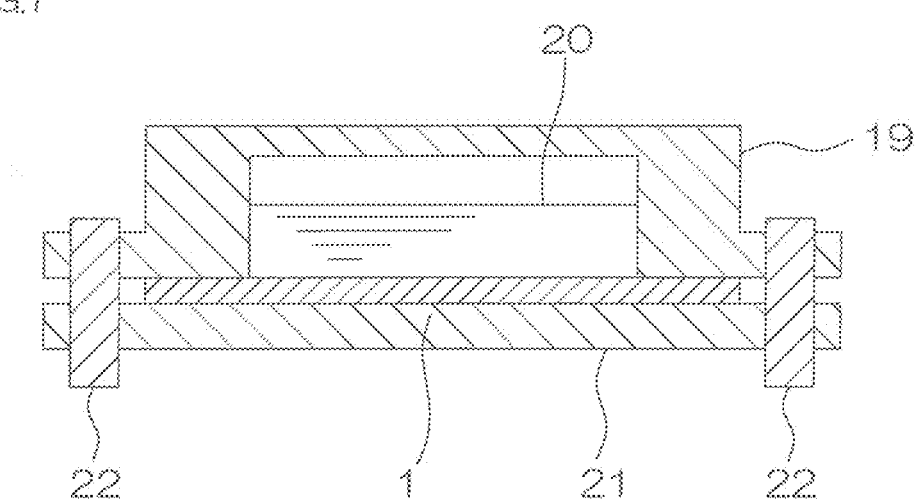
FIG. 7 shows a schematic sectional view of a blocking test of diethyl carbonate used for evaluation of Examples.

Next, as shown in FIG. 7, 2 ml of diethyl carbonate 20 was poured in a water vapor permeability cup 19 having an inner diameter of 18 mm and the laminated electrically conductive sheet 1 was provided so as to cover an opening of the water vapor permeability cup 19. Then, the laminated electrically conductive sheet 1 was fixed to the opening of the water vapor permeability cup 19 using a lid 21 with screws 22 so that the diethyl carbonate 20 did not leak from between the laminated electrically conductive sheet 1 and the water vapor permeability cup 19. To be specific, the water vapor permeability cup 19 was reversed upside down so that the diethyl carbonate 20 was brought into contact with the electrically conductive layer 3 (ref: FIG. 5(d)) to be then allowed to stand at 25° C. for 168 hours, and a blocking test of the diethyl carbonate was performed.

Thereafter, the mass of the diethyl carbonate before or after the test was measured to calculate the mass change of the diethyl carbonate and the ion barrier properties were evaluated based on the following criteria. The results are shown in Table 2.

Good: The mass change (%) was 0% or more and less than 1%.

Poor: The mass change (%) was 1% or more and 2% or less.

Bad: The mass change (%) was above 2.0%.

The mass change was obtained by the following formula.

Mass Change (%)=[(mass of diethyl carbonate after test−mass of diethyl carbonate to be charged)/mass of diethyl carbonate to be charged]×100

TABLE 2

|  | Ex. | | | | | | Comp. Ex. |
| --- | --- | --- | --- | --- | --- | --- | --- |
|  | Ex. 1 | Ex. 2 | Ex. 3 | Ex. 4 | Ex. 5 | Ex. 6 | Ex. 7 |
| Resin-Containing Layer | Production Ex. A Formed of Sheet | Production Ex. B Formed of Sheet | Production Ex. B Formed of Sheet | Production Ex. B Formed of Sheet | Production Ex. B Formed of Sheet | Production Ex. C Formed of Sheet | Production Ex. D Formed of Sheet |
| Forming Method of Electrically Conductive Layer | Production Ex. 1 Transfer Method | Production Ex. 1 Transfer Method | Production Ex. 1 Transfer Method | Production Ex. 1 Transfer Method | Production Ex. 2 Transfer Method | Production Ex. 1 Transfer Method | Production Ex. 1 Transfer Method |
| Support Board | SUS304 H-TA | SUS304 H-TA | SUS304 H-TA | SUS304 H-TA | Aluminum Foil | SUS304 H-TA | SUS304 H-TA |
| Thickness of Electrically Conductive Layer [μm] | 0.2 | 0.2 | 1 | 5 | 0.3 | 0.5 | 0.3 |
| Appearance | Good | Good | Good | Good | Good | Good | Good |
| Pinhole | Poor | Poor | Good | Good | Good | Good | Good |
| Ion Barrier Properties | Poor | Poor | Good | Good | Good | Good | Good |
| Weight Change [%] | 1.6 | 1.5 | 0.18 | 0.1 | 1.3 | 0.8 | 1.4 |

|  | Ex. | | Comp. Ex. | | |
| --- | --- | --- | --- | --- | --- |
|  | Ex. 8 | Ex. 9 | Comp. Ex. 1 | Comp. Ex. 2 | Comp. Ex. 3 |
| Resin-Containing Layer | Formed by Application of varnish | Formed by Application of varnish | Production Ex. C Formed of Sheet | Production Ex. C Formed of Sheet | Production Ex. C Formed of Sheet |
| Forming Method of Electrically Conductive Layer | Production Ex. 1 Transfer Method | Production Ex. 1 Transfer Method | Production Ex. 3 Direct Method | Production Ex. 3 Direct Method | Production Ex. 3 Direct Method |

TABLE 2-continued

|  | | | | | |
|---|---|---|---|---|---|
| Support Board | SUS304 H-TA | SUS304 H-TA | — | — | — |
| Thickness of Electrically Conductive Layer [μm] | 0.5 | 0.5 | 0.2 | 1 | 15 |
| Appearance | Good | Good | Bad | Bad | Bad |
| Pinhole | Good | Good | Bad | Bad | Bad |
| Ion Barrier Properties | Good | Good | Bad | Bad | Bad |
| Weight Change [%] | 0.2 | 0.2 | 2.8 | 2.7 | 2.4 |

While the illustrative embodiments of the present invention are provided in the above description, such is for illustrative purpose only and it is not to be construed as limiting the scope of the present invention. Modification and variation of the present invention that will be obvious to those skilled in the art is to be covered by the following claims.

What is claimed is:

1. A method for producing a laminated electrically conductive sheet comprising the steps of:
   preparing a support board,
   forming an electrically conductive layer at one side in a thickness direction of the support board by plating, and
   transferring the electrically conductive layer onto at least one surface in the thickness direction of a resin-containing layer as a single layer blended with a resin and an electrically conductive filler.

2. The method for producing a laminated electrically conductive sheet according to claim 1, wherein
   the step of transferring the electrically conductive layer onto the resin-containing layer includes the steps of
   preparing the resin-containing layer as a resin-containing sheet and
   laminating the prepared resin-containing sheet and the electrically conductive layer.

3. The method for producing a laminated electrically conductive sheet according to claim 1, wherein
   the step of transferring the electrically conductive layer onto the resin-containing layer includes a step of forming the resin-containing layer by applying a varnish containing a resin to the electrically conductive layer.

4. The method for producing a laminated electrically conductive sheet according to claim 1, wherein
   a release layer is formed on one surface in the thickness direction of the support board.

5. The method for producing a laminated electrically conductive sheet according to claim 4, wherein
   the release layer is made of a metal oxide and/or a passivated metal.

6. The method for producing a laminated electrically conductive sheet according to claim 1, wherein
   the support board is made of stainless steel and/or aluminum.

7. The method for producing a laminated electrically conductive sheet according to claim 1, wherein
   the thickness of the electrically conductive layer is 0.1 μm or more and 5 μm or less.

8. The method for producing a laminated electrically conductive sheet according to claim 1, wherein
   the resin-containing layer has electrically conductive properties.

9. The method for producing a laminated electrically conductive sheet according to claim 1, wherein
   the resin is a thermoplastic resin and/or a thermosetting resin.

* * * * *